(12) United States Patent
Goel et al.

(10) Patent No.: US 12,099,955 B2
(45) Date of Patent: Sep. 24, 2024

(54) MACHINE LEARNING MODELS BASED METHODS AND SYSTEMS FOR DETERMINING PROSPECTIVE ACQUISITIONS BETWEEN BUSINESS ENTITIES

(71) Applicant: MASTERCARD INTERNATIONAL INCORPORATED, Purchase, NY (US)

(72) Inventors: Samarth Goel, Gurugram (IN); Karamjit Singh, Gurugram (IN); Ajay Panwar, Gurgaon (IN); Tanmoy Bhowmik, Bangalore (IN); Kamal Kant, Patna (IN); Aniruddha Mitra, Kolkata (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 166 days.

(21) Appl. No.: 17/712,611

(22) Filed: Apr. 4, 2022

(65) Prior Publication Data
US 2022/0318715 A1    Oct. 6, 2022

(30) Foreign Application Priority Data

Apr. 5, 2021   (IN) .............................. 202141016079

(51) Int. Cl.
*G06Q 10/00*    (2023.01)
*G06N 5/02*    (2023.01)
(Continued)

(52) U.S. Cl.
CPC ......... *G06Q 10/06375* (2013.01); *G06N 5/02* (2013.01); *G06Q 10/067* (2013.01)

(58) Field of Classification Search
None
See application file for complete search history.

(56) References Cited

U.S. PATENT DOCUMENTS

| | | | |
|---|---|---|---|
| 8,706,659 B1 * | 4/2014 | Mann | G06N 20/00 706/12 |
| 9,195,941 B2 * | 11/2015 | Mojsilovic | G06N 5/02 |
| 9,760,655 B2 * | 9/2017 | Agarwal | G06F 16/9024 |
| 10,303,999 B2 | 5/2019 | Hertz et al. | |
| 11,176,495 B1 * | 11/2021 | Ron | G06Q 30/0201 |
| 11,562,453 B2 * | 1/2023 | Eidelman | G06F 16/288 |

(Continued)

OTHER PUBLICATIONS

Sharchilev, Boris, et al. "Web-based startup success prediction." Proceedings of the 27th ACM international conference on information and knowledge management. 2018. (Year: 2018).*

(Continued)

*Primary Examiner* — Gurkanwaljit Singh
(74) *Attorney, Agent, or Firm* — Barta Jones, PLLC

(57) ABSTRACT

Embodiments provide methods and systems for determining prospective acquisitions among business entities using machine learning techniques. Method performed by server system includes accessing financial data items and news items associated with finances of business entities from data sources for particular time duration. Method includes generating financial and news feature vectors corresponding to business entities and applying machine learning models over financial feature vectors and news feature vectors associated with business entities for determining candidate set of business entities predicted to be engaged in business acquisition in future. Method includes creating dynamic bipartite knowledge graph for each distinct time durations within particular time duration and generating static bipartite knowledge graph based on dynamic bipartite knowledge graphs for distinct time durations. Method includes predicting occurrence of acquisition of at least one business entity of candidate set of business entities based on supervised machine learning model and static bipartite knowledge graph.

18 Claims, 7 Drawing Sheets

(51) Int. Cl.
  *G06Q 10/0637*   (2023.01)
  *G06Q 10/067*   (2023.01)

(56) References Cited

U.S. PATENT DOCUMENTS

| | | | | |
|---|---|---|---|---|
| 2002/0107698 | A1* | 8/2002 | Brown | G06Q 40/12 |
| | | | | 709/202 |
| 2008/0270314 | A1 | 10/2008 | Birney et al. | |
| 2010/0179930 | A1* | 7/2010 | Teller | G06N 20/00 |
| | | | | 706/12 |
| 2012/0310841 | A1* | 12/2012 | Payne | G06Q 10/06 |
| | | | | 705/301 |
| 2015/0287051 | A1 | 10/2015 | Baig et al. | |
| 2016/0371618 | A1* | 12/2016 | Leidner | G06F 16/2246 |
| 2018/0082183 | A1* | 3/2018 | Hertz | G06Q 10/10 |
| 2018/0357586 | A1* | 12/2018 | Goergen | G06N 7/01 |
| 2019/0180376 | A1 | 6/2019 | Huang et al. | |

OTHER PUBLICATIONS

Kazemi, Seyed Mehran, et al. "Representation learning for dynamic graphs: A survey." The Journal of Machine Learning Research 21.1 (2020): 2648-2720. (Year: 2020).*

Duffie, Darrell, Leandro Saita, and Ke Wang. "Multi-period corporate default prediction with stochastic covariates." Journal of financial economics 83.3 (2007): 635-665. (Year: 2007).*

Porzio, M., "6 Key Financial Indicators Of Attractive Acquisition Targets" Forbes, https://www.forbes.com/sites/mattporzio/2016/10/03/6-key-financial-indicators-of-attractive-acquisition-targets/#c3ae6971ab35, Oct. 3, 2016, 4 pages.

Jiang, T., "Using Machine Learning to Analyze Merger Activity", http://giovanniperi.ucdavis.edu/uploads/5/6/8/2/56826033/tiffany_jiang.pdf, Mar. 16, 2018, 12 pages.

Xiang, G., et al., "A Supervised Approach to Predict Company Acquisition With Factual and Topic Features Using Profiles and News Articles on Tech Crunch", Association for the Advancement of Artificial Intelligence, http://www.cs.cmu.edu/~guangx/papers/icwsm12-long.pdf, 2012, 8 pages.

Mori, J., et al., "Finding business partners and building reciprocal relationships—A machine learning approach", IEEE Xplore, https://ieeexplore.ieee.org/document/5996005, Aug. 22, 2011, 4 pages.

Routledge, B.R., et al., "Predicting Merger Targets and Acquirers from Text", https://pdfs.semanticscholar.org/da93/25c1b18a6b66aba83486095a3db814d55375.pdf?_ga=2.175321570.1135954205.1584347313-1403798557.1581922352, Semantic Scholar, 2013, 4 pages.

* cited by examiner

|  | BUSINESS ENTITY NAME | BUSINESS ENTITY CODE | TOTAL ASSETS | ASSET GROWTH RATE | TOTAL LOANS AND LOSSES | LOAN GROWTH RATE | GROSS LOANS /ASSETS | TOTAL DEPOSITS |
|---|---|---|---|---|---|---|---|---|
| 2017Q1 | XYZ | 1234 | 289943 | 54.58 | 109227 | -22.41 | 37.67 | 244056 |
| 2017Q2 | XYZ | 1234 | 263442 | -36.56 | 107886 | -4.91 | 40.95 | 217229 |
| 2017Q3 | XYZ | 1234 | 277565 | 21.44 | 117277 | 34.82 | 42.25 | 230276 |
| 2017Q4 | XYZ | 1234 | 283375 | 8.37 | 115006 | -7.75 | 40.58 | 235510 |
| 2018Q1 | XYZ | 1234 | 276169 | -10.17 | 109090 | -20.58 | 39.5 | 227158 |
| 2018Q2 | XYZ | 1234 | 273607 | -3.71 | 97351 | -43.04 | 35.58 | 224319 |
| 2018Q3 | XYZ | 1234 | 259882 | -20.07 | 92060 | -21.74 | 35.42 | 209168 |
| 2018Q4 | XYZ | 1234 | 266239 | 9.78 | 93176 | 4.85 | 35 | 214473 |

MACHINE LEARNING MODELS BASED METHODS AND SYSTEMS FOR DETERMINING PROSPECTIVE ACQUISITIONS BETWEEN BUSINESS ENTITIES

CROSS-REFERENCE TO RELATED APPLICATION(S)

This application claims priority to India Patent Application No. 202141016079 filed Apr. 5, 2021, entitled "Machine Learning Models Based Methods and Systems for Determining Prospective Acquisitions Between Business Entities", the entirety of which is incorporated herein by reference.

TECHNICAL FIELD

The present disclosure relates to artificial intelligence processing systems and, more particularly to, electronic methods and complex processing systems for determining prospective business acquisitions among business entities, through use of machine learning techniques.

BACKGROUND

Nowadays mergers and tie-ups have become crucial business decisions in various business entities. Before taking investment decisions, business entities determine how combining features with another business entity will affect their overall growth. This is necessary to avoid any losses or collapse in market value. Therefore, predicting an overall growth after acquiring or after being acquired by another business entity is necessary for positive market growth.

This prediction of overall growth is performed by taking into account experience and prior knowledge of the businesses. Therefore, the prediction is usually performed by humans. However, there are various shortcomings in predicting acquisitions and growth rates after acquisitions by humans. Firstly, it is prone to errors as a lot of data is involved. Any miss in crucial information may result in wrong predictions. Further, it is risky to make such crucial decisions on bleak guess work. In addition, since the prediction is performed by human, limited business entities and dimensions can be taken into account while considering acquisitions.

Therefore, there exists a need to address the above-mentioned problems of relying on humans as agents to predict the acquisitions and the growth rate. More particularly, there is a technological need to automate the process of predicting acquisitions and determining growth rates of business entities after acquisitions.

SUMMARY

Various embodiments of the present disclosure provide methods and system for determining prospective acquisitions among business entities using machine learning techniques.

In an embodiment, a computer-implemented method is disclosed. The computer-implemented method performed by a server system includes accessing financial data items and news items associated with finances of a plurality of business entities from one or more data sources for a particular time duration. The computer-implemented method further includes generating a plurality of financial feature vectors and a plurality of news feature vectors corresponding to the plurality of business entities based, at least in part, on the financial data items and news items associated with the finances. The computer-implemented method also includes applying machine learning models over the plurality of financial feature vectors and the plurality of news feature vectors associated with the plurality of business entities for determining a candidate set of business entities predicted to be engaged in business acquisition in future. The computer-implemented method includes creating a dynamic bipartite knowledge graph for each of distinct time durations within the particular time duration based, at least in part, on company-specific features of the candidate set of business entities. The dynamic bipartite knowledge graph represents a computer-based graph representation of the candidate set of business entities as nodes, and relationship between the nodes as edges. Further, the computer-implemented method includes generating a static bipartite knowledge graph based, at least in part, on dynamic bipartite knowledge graphs created for the distinct time durations. Nodes of the static bipartite knowledge graph represent the candidate set of business entities and a pre-determined time duration and edges of the static bipartite knowledge graph represent relationship between the nodes for the pre-determined time duration. The computer-implemented method also includes predicting an occurrence of an acquisition of at least one business entity of the candidate set of business entities based, at least in part, on a supervised machine learning model and the static bipartite knowledge graph.

In another embodiment, a server system is disclosed. The server system includes a communication interface, a memory including executable instructions, and a processor communicably coupled to the communication interface. The processor is configured to execute the executable instructions to cause the server system to at least access financial data items and news items associated with finances of a plurality of business entities from one or more data sources for a particular time duration. The server system is further caused to generate a plurality of financial feature vectors and a plurality of news feature vectors corresponding to the plurality of business entities based, at least in part, on the financial data items and news items associated with the finances. The server system is also caused to apply machine learning models over the plurality of financial feature vectors and the plurality of news feature vectors associated with the plurality of business entities for determining a candidate set of business entities predicted to be engaged in business acquisition in future. Further, the server system is caused to create a dynamic bipartite knowledge graph for each of distinct time durations within the particular time duration based, at least in part, on company-specific features of the candidate set of business entities. The dynamic bipartite knowledge graph represents a computer-based graph representation of the candidate set of business entities as nodes, and relationship between the nodes as edges. Furthermore, the server system is caused to generate a static bipartite knowledge graph based, at least in part, on dynamic bipartite knowledge graphs created for the distinct time durations. Nodes of the static bipartite knowledge graph represent the candidate set of business entities and a pre-determined time duration and edges of the static bipartite knowledge graph represent relationship between the nodes for the pre-determined time duration. Further, the server system is caused to predict an occurrence of an acquisition of at least one business entity of the candidate set of business entities based, at least in part, on the static bipartite knowledge graph and a supervised machine learning model.

In another embodiment, a computer-implemented method is disclosed. The computer-implemented method performed by a server system includes accessing financial data items and news items associated with finances of a plurality of business entities from one or more data sources for a particular time duration. The computer-implemented method further includes generating a plurality of financial feature vectors and a plurality of news feature vectors corresponding to the plurality of business entities based, at least in part, on the financial data items and news items associated with the finances. The computer-implemented method also includes applying machine learning models over the plurality of financial feature vectors and the plurality of news feature vectors associated with the plurality of business entities for determining a candidate set of business entities predicted to be engaged in business acquisition in future. The computer-implemented method includes creating a dynamic bipartite knowledge graph for each of distinct time durations within the particular time duration based, at least in part, on company-specific features of the candidate set of business entities. The dynamic bipartite knowledge graph represents a computer-based graph representation of the candidate set of business entities as nodes, and relationship between the nodes as edges. Further, the computer-implemented method includes generating a static bipartite knowledge graph based, at least in part, on dynamic bipartite knowledge graphs created for the distinct time durations. Nodes of the static bipartite knowledge graph represent the candidate set of business entities and a pre-determined time duration and edges of the static bipartite knowledge graph represent relationship between the nodes for the pre-determined time duration. Additionally, the computer-implemented method includes encoding the static bipartite knowledge graph into graph embedding vectors based, at least in part, on a bipartite graph embedding model. The computer-implemented method also includes predicting an occurrence of an acquisition of at least one business entity of the candidate set of business entities by applying a supervised machine learning model over the graph embedding vectors.

BRIEF DESCRIPTION OF THE FIGURES

For a more complete understanding of example embodiments of the present technology, reference is now made to the following descriptions taken in connection with the accompanying drawings in which:

FIG. 3. is an example representation of financial data which are used to create financial feature vectors, in accordance with one embodiment of the present disclosure;

Figure 1:
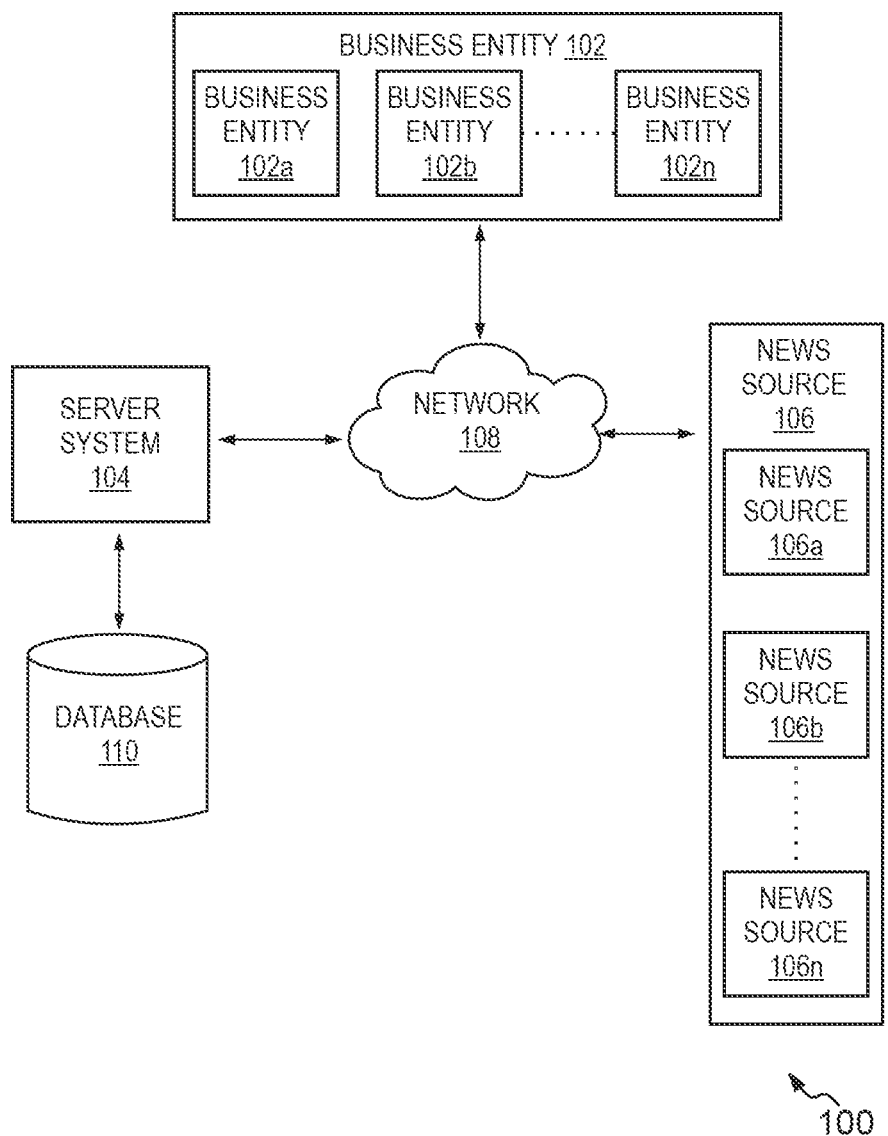
FIG. 1 is an example representation of an environment, related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms "business entities", "companies", or "financial institution" herein refer to any financial enterprises, financial companies, or organizations of financial domain.

The term "news sources" refers to news-affiliated entity or an online news provider providing news content. For example, a news source may be a news broadcasting company or a newspaper company. The news source may be associated with a web site having various web pages, a television program, an online or printed newspaper, an online journal, an online blog, or other information-delivery medium. Examples of news sources include news broadcasting companies, news web sites, newspaper publishers and/or and their affiliated web sites. The web pages associated with a news source may include news stories, articles, short news features (summaries, excerpts, etc.), photos, live video streaming, audio packages, commentaries, blogs, interactive multimedia, searchable archives of news features, background information, and the like.

The term "graph embedding vector" refers to include a set of measurable properties (or "features") that represent some objects or relation between two entities. A graph embedding vector can include collections of data represented digitally in an array or vector structure. A graph embedding vector may also include collections of data that can be represented as a mathematical vector, on which vector operations such as the scalar product can be performed. A graph embedding vector can be determined or generated from a knowledge graph after graph traversal. A graph embedding vector can be used as the input to a machine learning model, such that the machine learning model produces some output or classification.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various example embodiments of the present disclosure provide methods, and server system for determining prospective acquisitions between business entities using machine learning techniques. The prediction of acquisitions is based on financial data of the business entities. The acquisitions of business entities are also based on the real-time news related to the business entities collected from various news sources.

In various example embodiments, the present disclosure describes a server system that predicts acquisitions of business entities and their growth rates after acquisitions. The server system is configured to access financial data items and news items of a plurality of business entities. The financial data items corresponding to a business entity may include, but are not limited to, total assets, asset growth rate, total loans, total losses, loan growth rate, gross loans, gross assets, total deposits, etc. The news items of a business entity may be financial news related to the business entity gathered from a variety of news sources. The news items may be, but not limited to, financial news, or management news. The news items may also be gathered from blogs, articles, newspapers, news channels, internet, social media websites, websites of various business entities etc.

Subsequent to accessing the financial data items and news items, the server system is configured to generate a plurality of financial feature vectors corresponding to the plurality of business entities based at least in part on financial data items. The server system is configured to generate a plurality of news feature vectors corresponding to the plurality of business entities based at least in part on the news items. The server system is configured to apply machine learning models over the plurality of financial feature vectors and the plurality of news feature vectors associated with the plurality of business entities for determining a candidate set of business entities predicted to be engaged in business acquisition in future.

In particular, the server system is configured to apply a first long short-term memory (LSTM) model using the plurality of financial feature vectors to output a first set of vectors. The server system is further configured to apply a second LSTM model using the plurality of news feature vectors to output a second set of vectors. The server system is configured to concatenate the first set of vectors and the second set of vectors to obtain a set of concatenated vectors. For each business entity of the plurality of business entities, the server system is configured to generate a probable growth rate on acquiring other business entity and a probable growth rate on getting acquired by other business entity by applying a feed forward neural network model over the set of concatenated vectors. The server system is then configured to select the candidate set of business entities predicted to be engaged in business acquisition in future based on the generated probable growth rates. The server system is configured to select those business entities which have high probable growth on acquiring other business entities and to select those business entities which have high probable growth rate on getting acquired by other business entities.

Thereafter, the server system is configured to create a dynamic bipartite knowledge graph for each of distinct time durations (e.g., "quarter of a year") within the particular time duration based, at least in part, on company-specific features of the candidate set of business entities. The company-specific features may include the financial data items, the news items, and the generated probable growth rates associated with each business entity. Each node of the dynamic bipartite knowledge graph corresponds to each business entity of the candidate set of business entities. Each edge of the dynamic bipartite knowledge graph represents acquisition of a business entity of the candidate set of business entities. The strength of each edge in the dynamic bipartite knowledge graph represents the probable growth rates generated by the server system while determining the candidate set of business entities.

In one embodiment, the server system is configured to generate a static bipartite knowledge graph based, at least in part, on the dynamic bipartite knowledge graph. Each node of the static bipartite knowledge graph represents features of each business entity of the candidate set of business entities for a pre-determined time duration. The server system if also configured to convert the static bipartite knowledge graph into positive and negative triplets. The positive triplets are $(N_{p1}, N_{p2}, E_{p1})$. $N_{p1}$ represents a first business entity, $N_{p2}$ represents a second business entity, and $E_{p1}$ represents an already existing link between the first and second business entities. The negative triplets are $(N_{n1}, N_{n2}, E_{n1})$. $N_{n1}$ represents a first business entity, $N_{n2}$ represents a second business entity, and $E_{n1}$ represents no link present between the first and second business entities. The server system is also configured to encode the static bipartite knowledge graph into graph embedding vectors based at least on a bipartite graph embedding model and apply a supervised machine learning model over the graph embedding vectors to predict an occurrence of an acquisition of at least one business entity of the candidate set of business entities.

Various embodiments of the present disclosure offer multiple advantages and technical effects. For instance, the present disclosure provides a system for predicting acquisitions or mergers by taking into account a huge amount of data of a large number of business entities. This makes the prediction error free and reliable. Further, no crucial information is missed since the prediction is performed by a machine learning model rather than by a human. Further, at the same time multiple predictions of acquisitions are possible.

Various example embodiments of the present disclosure are described hereinafter with reference to FIGS. 1 to 7.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, predicting acquisitions, etc. The environment 100 generally includes a plurality of business entities 102a, 102b . . . 102n, a server system 104, and one or more news sources 106a, 106b . . . 106n, each coupled to, and in communication with (and/or with access to) a network 108. The network 108 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among two or more of the entities illustrated in FIG. 1, or any combination thereof.

Various entities in the environment 100 may connect to the network 108 in accordance with various wired and wireless communication protocols, such as Transmission Control Protocol and Internet Protocol (TCP/IP), User Datagram Protocol (UDP), $2^{nd}$ Generation (2G), $3^{rd}$ Generation (3G), $4^{th}$ Generation (4G), $5^{th}$ Generation (5G) communication protocols, Long Term Evolution (LTE) communication protocols, or any combination thereof. For example, the network 108 may include multiple different networks, such as a private network made accessible by the plurality of business entities 102a, 102b . . . 102n, and one or more news sources 106a, 106b . . . 106n, separately, and a public network (e.g., the Internet etc.) through which the plurality of servers associated with the plurality of business entities 102a, 102b . . . 102n, and the one or more news sources 106a, 106b . . . 106n, and the server system 104 may communicate. The plurality of business entities 102a, 102b . . . 102n hereinafter is collectively represented as "the plurality of business entities 102" or "business entities 102". The plurality of news sources 106a, 106b . . . 106n hereinafter is collectively represented as "the news sources 106".

In one example, the plurality of business entities 102 may be, but not limited to, financial enterprises, financial companies, or organizations of financial domain. The news sources 106 refer to servers of any news channel dealing with financial news or business news, or any blogs, articles available on the Internet.

The server system 104 includes a processor and a memory. The server system 104 is configured to perform one or more of the operations described herein. In general, the server system 104 is configured to predict at least one business acquisition in future. The server system 104 should be understood to be embodied in at least one computing device in communication with the network 108, which may be specifically configured, via executable instructions, to perform as described herein, and/or embodied in at least one non-transitory computer readable media. The environment 100 further shows a database 110 which is accessible by the server system 104. In another embodiment, the database 110 is incorporated in the server system 104.

The server system 104 is configured to predict business acquisitions of at least one business entity in future. The server system 104 is configured to collect news items from the news sources 106 and financial data from the business entities 102. In an alternate embodiment, the server system 104 is configured to store the news items and financial data in the database 110 and then access the relevant data from the database 110 when required. Using the collected news items and financial data, the server system 104 is configured to generate a candidate set of business entities which may be engaged in business acquisitions in future. The server system 104 is configured to generate knowledge graphs based on the candidate set of business entities and finally, the server system 104 is configured to predict the links between the candidate set of business entities based on the knowledge graphs. These predicted links represent future acquisition of business entities.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100.

Figure 2:
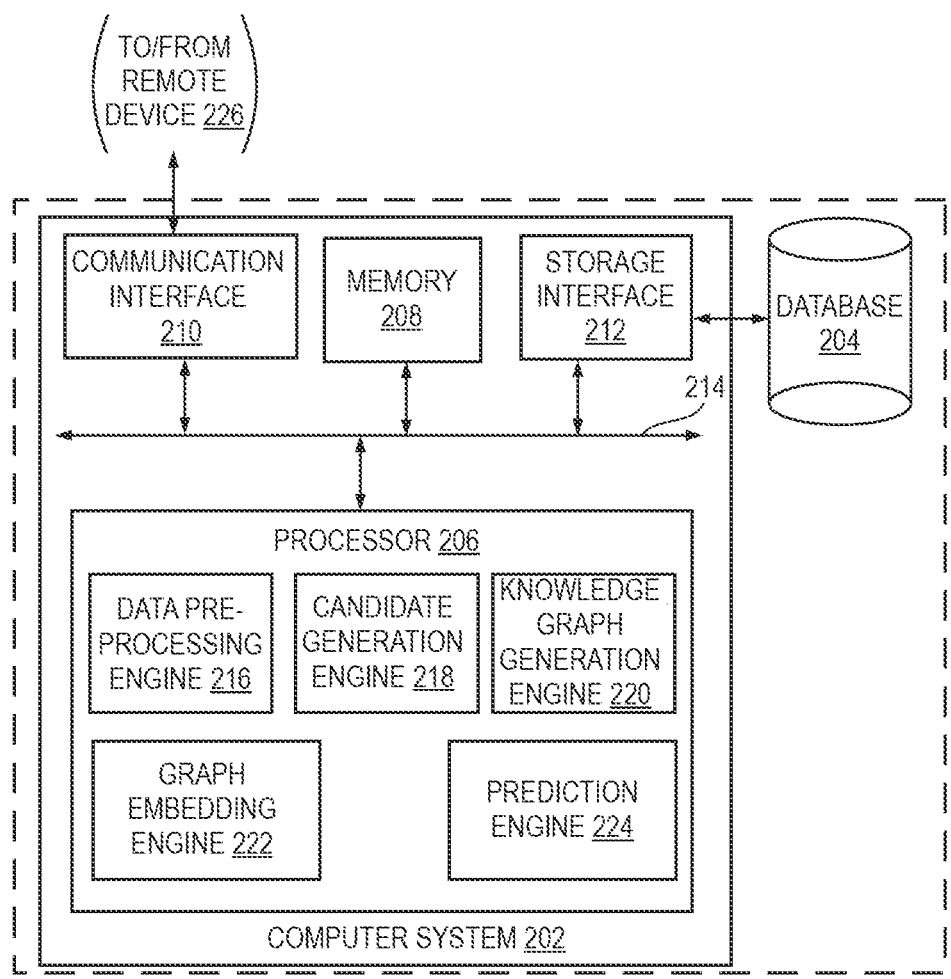
FIG. 2 is a simplified block diagram of a server system, in accordance with one embodiment of the present disclosure.

Referring now to FIG. 2, a simplified block diagram of a server system 200, is shown, in accordance with an embodiment of the present disclosure. The server system 200 is similar to the server system 104. In some embodiments, the server system 200 is embodied as a cloud-based and/or SaaS-based (software as a service) architecture. The server system 200 includes a computer system 202 and a database 204. The computer system 202 includes at least one processor 206 for executing instructions, a memory 208, and a communication interface 210, that communicate with each other via a bus 214.

In some embodiments, the database 204 is integrated within the computer system 202. For example, the computer system 202 may include one or more hard disk drives as the database 204. A storage interface 212 is any component capable of providing the processor 206 with access to the database 204. The storage interface 212 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204.

In one embodiment, the database 204 is configured to store one or more trained machine learning models for determining a candidate set of business entities which may be engaged in business acquisition in future.

The processor 206 includes a data pre-processing engine 216, a candidate generation engine 218, a knowledge graph generation engine 220, a graph embedding engine 222, and a prediction engine 224.

The processor 206 includes suitable logic, circuitry, and/or interfaces to execute operations for receiving financial data items and news items associated with finances (also referred as "financial news items") of the plurality of business entities 102. Examples of the processor 206 include, but are not limited to, an application-specific integrated circuit (ASIC) processor, a reduced instruction set computing (RISC) processor, a complex instruction set computing (CISC) processor, a field-programmable gate array (FPGA), and the like. The memory 208 includes suitable logic, circuitry, and/or interfaces to store a set of computer-readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the server system 200, as described herein. In another embodiment, the memory 208 may be realized in the form of a database server or cloud storage working in conjunction with the server system 200, without departing from the scope of the present disclosure.

The processor 206 is operatively coupled to the communication interface 210 such that the processor 206 is capable of communicating with a remote device 226 such as, server associated with business entities 102 or news sources 106 or communicated with any entity connected to the network 108 (as shown in FIG. 1).

It is noted that the server system 200 as illustrated and hereinafter described is merely illustrative of an apparatus that could benefit from embodiments of the present disclosure and, therefore, should not be taken to limit the scope of the present disclosure. It is noted that the server system 200 may include fewer or more components than those depicted in FIG. 2.

The data pre-processing engine 216 includes suitable logic and/or interfaces for accessing financial data items and news items associated with finances (also referred as "financial news items") of the plurality of business entities 102 (i.e., "financial companies") from one or more data sources (e.g., "S&P financial blog", news sources 106, etc.) for a particular time duration (e.g., one year). The data-preprocessing engine 216 is configured to perform data-cleaning, normalization, and feature extraction, etc. In one embodiment, the data pre-processing engine 216 is configured to analyze the financial data items and the news items and extract predictive features associated with the plurality of business entities 102. The financial data items of a particular business entity may include, but not limited to, total assets, asset growth rate, total loans, total losses, loan growth rate, gross loans, gross assets, and total deposits, etc. The financial data items may be collected from various sources like servers associated with business entities, revenue reports associated with business entities, etc. Further, the financial news items associated with a particular business entity may include, but are not limited to, financial news, management news, blogs, and articles related to finance and business.

The financial data items and the financial news items associated with the plurality of business entities are collected for a pre-determined time duration. In an exemplary embodiment, the financial data items and the financial news items of the past 8 quarters of the last 2 years are collected. Further, the financial data items and the financial news items associated with the plurality of business entities are continuously updated.

Figure 4:
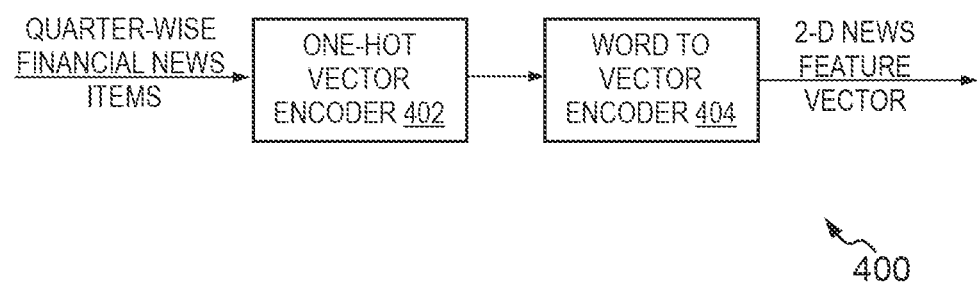
FIG. 4 is a schematic block diagram depicting creation of news feature vectors, in accordance with one embodiment of the present disclosure.

In one embodiment, the data pre-processing engine 216 may use natural language processing (NLP) algorithms to generate a plurality of multi-dimensional financial feature vectors and a plurality of multi-dimensional news feature vectors from the financial data items and the news items, respectively. The financial data items are shown in detail in FIG. 3. Further, the process of generating news feature vectors from the financial news items is shown in FIG. 4.

In the training phase, the data pre-processing engine 216 is configured to access the financial data items and the financial news items associated with a plurality of business entities for a longer time duration, for example, the first 6 quarters of past 2 years. However, for execution phase or prediction phase, the data pre-processing engine 216 may be configured to access the financial data items and the financial news items associated with the plurality of business entities for a time duration shorter than that used in the training phase, for example, last 2 quarters of last year.

Figure 5:
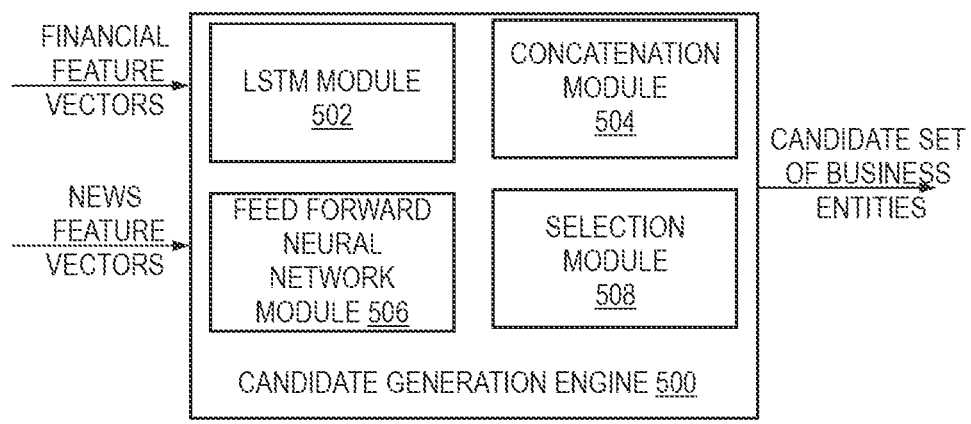
FIG. 5 is a schematic block diagram of a candidate generation engine, in accordance with one embodiment of the present disclosure.

The candidate generation engine 218 includes suitable logic and/or interfaces for determining a candidate set of business entities predicted to be engaged in business acquisition in the future using machine learning models. The candidate generation engine 218 is configured to apply various machine learning models over the plurality of financial feature vectors and the plurality of news feature vectors. The process of generation of the candidate set of business entities by the candidate generation engine 218 is shown in FIG. 5 and is explained in detail later.

In one embodiment, the candidate generation engine 218 is configured to predict future values associated with each financial data items. In particular, the candidate generation engine 218 is configured to output the first set of vectors based, at least in part, on the plurality of financial feature vectors using a first long short-term memory (LSTM) machine learning model. In particular, the candidate generation engine 218 is configured to apply the first LSTM model over the plurality of financial feature vectors to output the first set of vectors.

In general, LSTMs are specializations of Recurrent Neural Networks (RNN), which have the form of a chain of repeating neural network modules. The RNNs have emerged as the preferred neural network architecture for data that is modeled as a sequence. In the context of the financial features of a business entity, the first LSTM machine learning model is configured to predict financial features (such as, assets, growth rate, loan, market share value, etc.). The LSTM model is trained to learn long-term dependencies of each financial features. During the training, weights and biases associated with the LSTM model are computed by minimizing an objective function.

In particular, the first LSTM model is trained based on past financial data items of the plurality of business entities 102 for a long time duration. During the execution, the first LSTM model is able to predict future (e.g., "next month quarter") values associated with the plurality of financial features of the plurality of business entities 102.

In similar manner, the news features are fed to a second LSTM model for predicting second output vectors. The second LSTM model is applied over the plurality of news feature vectors to output a second set of vectors.

The candidate generation engine 218 is configured to combine the first set of vectors and the second set of vectors and provide the combined vectors to a feed-forward neural network model for generating a probable growth rate on getting acquired and a probable growth rate on acquiring for each business entity. The feed-forward neural network model includes, but is not limited to, multiple LSTM layers, and dense layers. The feed-forward neural network model uses the number of business entities, the number of quarters, and the number of financial features as input features for the feed-forward neural network model. In one embodiment, after training the feed-forward neural network model, the feed-forward neural network model is configured to determine a candidate set of business entities which may engaged in acquisition in future based on the probable growth rates, thereby reducing datasets for further processing.

The knowledge graph generation engine 220 includes suitable logic and/or interfaces for creating a dynamic bipartite knowledge graph for each of distinct time durations (e.g., "quarter of a year") within the particular time duration (e.g., 1 year) based on company-specific features (including the plurality of financial features, the plurality of news features, and the probable growth rates of getting acquired and acquiring) of the candidate set of business entities. Initially, the dynamic bipartite knowledge graph is configured using the probable growth rates associated with the candidate set of business entities. The dynamic bipartite knowledge graph includes multiple sub-graphs for the distinct time durations. For example, each sub-graph may correspond to a quarter of a year. Therefore, the dynamic bipartite knowledge graph for a year will have four sub-graphs. Each sub-graph corresponds to each quarter of the year.

Further, each node in a sub-graph corresponds to each business entity of the candidate set of business entities. Each node in the dynamic bipartite knowledge graph represents the financial features of a business entity. The dynamic bipartite knowledge graph is a directed graph, and it gets modified with time. Each edge joining two nodes in the sub-graphs represents a relationship between the business entities corresponding to the two nodes. The strength of the edge represents growth percentage predicted by the candidate generation engine 218. In one example, an edge represents the existing acquisition relationship between two business entities. For example, an edge directed from a first node to a second node in a sub-graph of a particular quarter implies that the business entity associated with the first node has acquired the business entity associated with the second node in that particular quarter.

The knowledge graph generation engine 220 further includes suitable logic and/or interfaces for creating a static bipartite knowledge graph based, at least in part, on dynamic bipartite knowledge graphs created for the distinct time durations. In one embodiment, the knowledge graph generation engine 220 is configured to partition the dynamic bipartite knowledge sub-graphs seasonally on a timely basis (i.e., on quarterly basis). The static bipartite knowledge graph includes a plurality of nodes and edges. Each node in the static bipartite knowledge graph represents the financial features of a business entity at a particular quarter. In contrast to the dynamic bipartite knowledge graph, there are no sub-graphs for a particular quarter present in the static bipartite knowledge graph. Further, the values and features of nodes in the static bipartite knowledge graph remain fixed as opposed to the dynamic bipartite knowledge graph. Each edge between two nodes represents the acquisition between the two business entities representing the two nodes. The conversion of the dynamic bipartite knowledge graph to the static bipartite knowledge graph is explained in detail later with reference to FIG. 6.

The graph embedding engine 222 further includes suitable logic and/or interfaces for encoding the static bipartite knowledge graph into graph embedding vectors using a bipartite graph embedding model. More particularly, the bipartite graph embedding model may transform the static bipartite knowledge graphs into corresponding vector representations. In general, the bipartite graph embedding model converts graph data into a low dimensional space in which graph structural information and graph properties are preserved at most.

In one embodiment, the bipartite graph embedding model may be determined by applying sampling, mapping, and optimization processes on the static bipartite knowledge graph. In one example, the bipartite graph embedding model uses a translation-based model (e.g., TransE model) which is energy-based model for learning low-dimensional embeddings of entities. In the sampling process, triplets (e.g., two nodes and a relation between them) are extracted. Two types of triplets are extracted—positive triplets and negative triplets. The positive triplets are ($N_1$, $N_2$, $E_1$), where $N_1$ represents a first business entity, $N_2$ represents a second business entity, and $E_1$ represents if there is already a link between the first and second business entities. The negative triplets are ($N_1$, $N_2$, $E_2$), $N_1$, represents a first business entity, $N_2$ represents a second business entity, and $E_2$ represents if there is no link between the first and second business entities. In the mapping process, embedding stacking operations (e.g., pooling, averaging, etc.) are applied on the triplets. In the optimization process, a set of optimization functions are applied to find a graph embedding model that preserves original properties of the static bipartite knowledge graph. The set of optimization functions may be, but not limited to, root mean squared error (RMSE), Log likelihood, etc. During training phase, the bipartite graph embedding model is trained to minimize cost function.

In some embodiments, the bipartite graph embedding model may implement algorithms (such as, for example, Deepwalk, Matrix factorization, Large-scale information network embedding (LINE), Bayesian personalized ranking, graphlet algorithms, Node2vec., Graph2vec., Structural Deep Network Embedding (SDNE) etc.) over the static bipartite knowledge graph. In one embodiment, the bipartite graph embedding model may include first and second graph embedding models. In particular, the bipartite graph embedding model is utilized for converting the static bipartite knowledge graph into a latent space representation.

In one example, the bipartite graph embedding model implemented using Deepwalk models is configured to perform graph traversals from one node to another taking direction of the edges into a consideration and aggregate vector representations of traversed nodes next to each other in a matrix. The vector representations of the nodes are generated based on the company-specific features. Then, the matrix is provided to a recurrent neural network to generate graph embedding vectors.

During the training phase, the bipartite graph embedding modell learns a mapping from a graph network to a vector space, while preserving relevant graph network properties. The first graph embedding model is the one in which edges in triplets represents whether a business entity was acquired by another business entity. The second graph embedding model is the one in which edges in triplets represents whether a business entity acquired another business entity.

The prediction engine 224 is configured to predict an occurrence of an acquisition of at least one business entity of the candidate set of business entities based, at least on, applying a supervised machine learning model over the graph embedding vectors. In one example, the supervised machine learning model is the supervised bipartite graph link prediction model. More particularly, the prediction engine 224 is configured to predict whether there will be links between two nodes based on company-specific feature information associated with the nodes and the observed existing link information.

In one embodiment, the supervised bipartite graph link prediction model may be, supervised techniques, such as those involving artificial neural networks, association rule learning, recurrent neural networks (RNN), Bayesian networks, clustering, deep learning, decision trees, genetic algorithms, Hidden Markov Modeling, inductive logic programming, learning automata, learning classifier systems, logistic regressions, linear classifiers, quadratic classifiers, reinforcement learning, representation learning, rule-based machine learning, similarity and metric learning, sparse dictionary learning, support vector machines, and/or the like.

In one example, the supervised bipartite link prediction model can identify promising links in the two different nodes of the dynamic bipartite knowledge graph using the graph embedding vectors. More specifically, for each directional edge, the link prediction model can build a classifier that outputs the occurrence of a given edge for that particular node. An edge representing a business acquisition relationship between two companies can be associated with a respective score that is calculated by the classifier. The respective score can be based on a context of a link in a neighborhood of nodes and trends identified in the company-specific features of one or more neighborhood nodes. When the respective score for the edge is greater or equal to a predefined threshold value, the prediction engine 224 notifies market analysts about the most probable business acquisition between two business entities associated with the edge occurring within the particular time duration (e.g., next quarter) in future.

In one embodiment, the supervised bipartite link prediction model is trained by consuming the graph embedding vectors generated at distinct time durations (i.e., last 3 quarters). Then, the supervised bipartite link prediction model may successfully predict next business acquisitions among the candidate set of business entities in future when preset conditions are met.

Referring now to FIG. 3, an example representation of financial data which are used to create financial feature vectors is shown, in accordance with one embodiment of the present disclosure. Table 300 shows the financial data for a business entity named "XYZ" that is accessed from a server associated with the business entity "XYZ". Further, for every quarter of a pre-determined time duration, financial data like total assets, asset growth rate, total loans and losses, loan growth rate, gross loans and assets, and total deposits are accessed. For example, as shown in the table 300, the financial data for the year 2017 and the year 2018 divided into quarters is accessed. Similarly, the financial data for the plurality of business entities 102 is accessed by the data pre-processing engine 216 and it converts this data into feature vectors for each quarter.

Further, the financial data from the past quarters is used to train the machine learning models, while in the execution phase, financial data from recent quarters is used. For example, for training purposes the financial data of last two years may be used, while for prediction, the financial data of last two quarters may be taken into consideration. The financial data is then converted into financial feature vector by word to vector encoder present in the data pre-processing engine 216 using natural language processing (NLP) techniques.

Referring now to FIG. 4, a schematic block diagram 400 depicting creation of news feature vectors is shown, in accordance with one embodiment of the present disclosure. As shown in FIG. 4, the quarter-wise news data or news items for each business entity are accessed and are fed to one-hot vector encoder 402. It is to be noted that one-hot vector encoder 402 is included in the data pre-processing engine 216. The one-hot vector encoder 402 converts the quarter-wise news data into one-hot vector of a vocabulary of words stored in the database 204. For example, if the vocabulary has 1000 words, and the quarter-wise news data for a business entity has 400 words, in that case the one-hot vector will have 400 ones corresponding to the words present in the news data and 600 zeroes.

The one-hot vector is then fed to a word to vector encoder 404, which converts the one-hot vector into news feature vector which is a 2-D vector. It is to be noted that word to vector encoder 404 is included in the data pre-processing engine 216. In one example, the word to vector encoder 404 utilizes natural language processing (NLP) techniques for creating the 2-D news feature vectors.

Referring now to FIG. 5, a schematic block diagram of a candidate generation engine 500 is shown, in accordance with one embodiment of the present disclosure. In an embodiment, the candidate generation engine 500 is the candidate generation engine 218 as shown in FIG. 2. The candidate generation engine 500 includes a long short-term memory (LSTM) module 502, a concatenation module 504, a feed forward neural network module 506, and a selection module 508.

The LSTM module 502 has multiple LSTM models. A first LSTM model is fed with the financial feature vector to output a first output vector. It is to be noted that the financial feature vector is a 2-dimensional (2-D) vector. A second LSTM model is fed with the news feature vector to output a second output vector.

The concatenation module 504 is configured to concatenate the first and second output vectors from the LSTM module 502 to output a concatenated vector.

The feed forward neural network module 506 includes a feed forward neural network model which is configured to calculate, for every business entity, a growth rate on getting acquired and a growth rate on acquiring. The feed forward neural network model is configured to calculate the growth rates using the concatenated vector. In the feed forward neural network, the connections between nodes do not form a cycle. There are no cycles or loops. Input in the feed forward neural network model moves in only one direction. In an embodiment, the input of the feed-forward neural network model is number of business entities, number of quarters, and number of financial and news features. The output of the feed-forward neural network model is number of business entities and label corresponding to the business entities. However, the data is skewed due to lack of sufficient positive samples of business entities in the candidate generation step. Therefore, to address this problem, oversampling is performed using Synthetic Minority Over-sampling Technique (SMOTE) and cleaning is performed using Edited Nearest Neighbors (ENN) algorithm. The combined terminology for oversampling is SMOTEENN. Using SMOTEENN, more positive samples are added to data while removing noise around the positive samples of the business entities.

In one embodiment, the feed-forward neural network includes a network architecture including multiple LSTM layers and dense layers. In one example, in the network architecture, three LSTM layers are applied with 256, 128, and 64 hidden nodes, respectively, to learn temporal behavior in the financial data and news items. Further, two dense layers with 100 and 50 nodes, respectively, are utilized. The dense layers are configured to map a set of output nodes of the LSTM layer to a single node. Further, two auxiliary time independent variables are added to the output of dense layer. The output of the dense layer is fed to an output layer. Each of the LSTM models and dense layers include Rectified Linear activation Unit (ReLU) as an activation function. The output layer utilizes a sigmoid function to calculate prediction outputs.

In an exemplary embodiment, a loss function (e.g., a binary cross entropy-loss function) is used in training to calculate the deviation between predictions and the desired output. An optimization technique such as, gradient descent optimization (e.g., Nadam) is utilized in the training to update weights in the dense layers. The goal of the optimization technique is to minimize the loss function.

The selection module 508 is configured to select those business entities which have growth rates on acquiring which are higher than a first pre-determined threshold. The selection module 508 is also configured to select those business entities which have growth rates on getting acquired which are higher than a second pre-determined threshold. The selected business entities are candidate set of business entities which are used to create dynamic bipartite knowledge graph.

For instance, the server system 200 extracts financial data and news data items associated with companies "A", "B", "C" and "D". Based on the financial data and news data items, the server system determines probable growth rates of getting company A acquired by company B and acquiring company B by company A. In other words, the server system 200 attempts to determine growth probabilities values of all possible acquisition relationships among companies A, B, C and D. Based on the growth probability values, the server system 200 makes a decision that companies A, B and C may engage in business acquisition relationship in future. Therefore, the companies A, B and C are termed as a candidate set of business entities.

Figure 6:
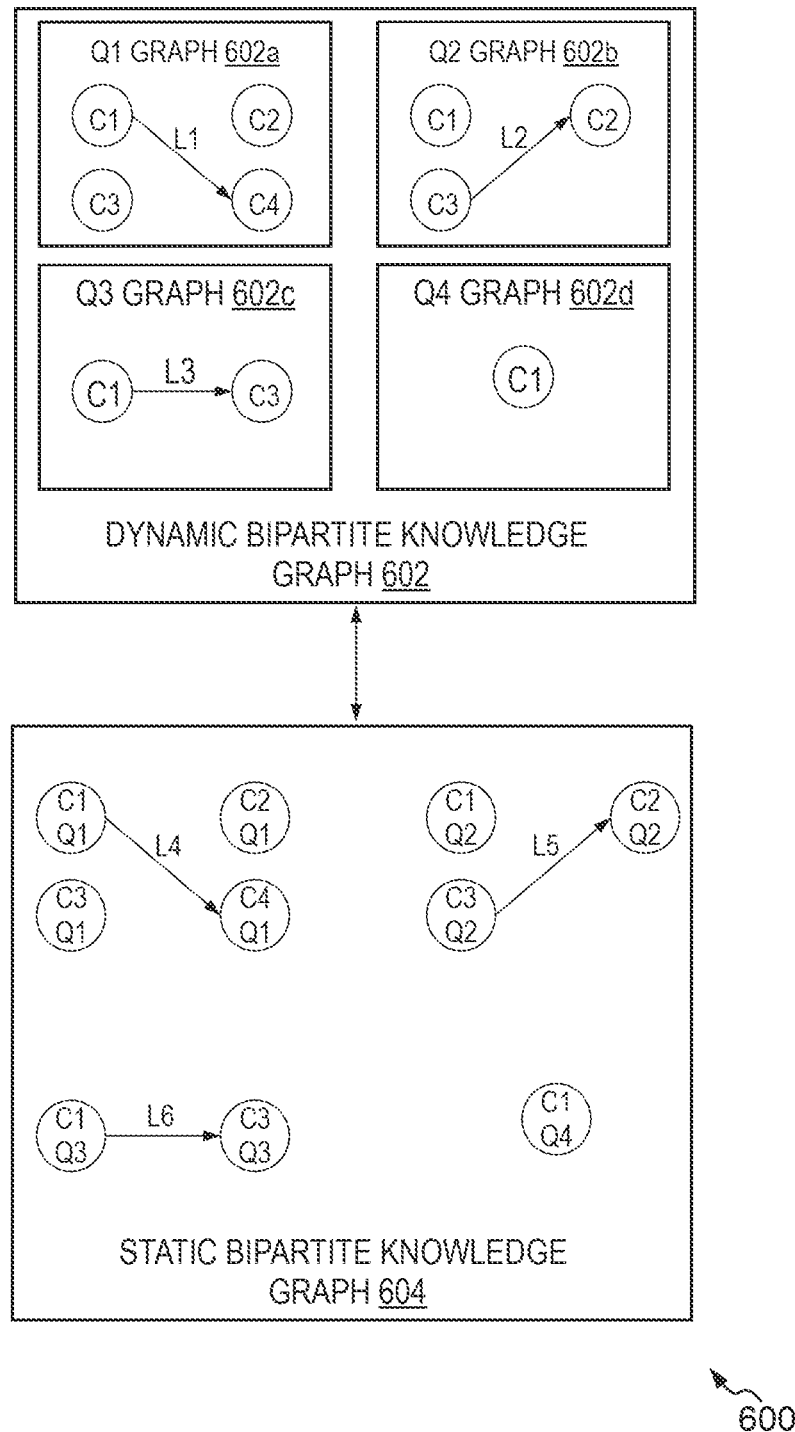
FIG. 6 is a schematic block diagram representation conversion of dynamic bipartite knowledge graph into static bipartite knowledge graph, in accordance with one embodiment of the present disclosure.

Referring now to FIG. 6, a schematic block diagram representation 600 depicting conversion process of dynamic bipartite knowledge graph 602 into static bipartite knowledge graph 604 is shown, in accordance with one embodiment of the present disclosure.

As mentioned previously, the dynamic bipartite knowledge graph 602 is created for each of distinct time durations within a particular time duration based, at least in part, on company-specific features of the candidate set of business entities. The dynamic bipartite knowledge graph includes multiple sub-graphs associated with distinct time durations.

As shown in the FIG. 6, Q1 graph 602a represents a sub-graph for first quarter of a year. Similarly, Q2 graph 602b, Q3 graph 602c, and Q4 graph 602d represent the sub-graphs for second, third, and fourth quarters of the year, respectively. The first, second, third and fourth quarters are distinct time durations within the particular time duration (e.g., 1 year). Each node in the sub-graph represents a business entity. Q1 graph 602a, has four nodes C1, C2, C3, and C4 representing business entities B1, B2, B3, and B4. Nodes C1, C2, C3, and C4 in Q1 graph 602a represent financial data and news data for business entities B1, B2, B3, and B4, respectively, corresponding to first quarter of the year. Similarly, nodes C1, C2, and C3 in Q2 graph 602b represent financial data and news data for business entities B1, B2, and B3, respectively, corresponding to second quarter of the year and so on.

Further, link L1 in Q1 graph 602a represents that business entity B1, corresponding to node C1 has acquired business entity B4, corresponding to node C4 in the first quarter. The strength of the link L1 represents the probable growth rate of the business entity B1 after acquiring business entity B4. In Q2 graph 602b, C4 is not present because of B4 being acquired by B1, and further link L2 represents that business entity B3, corresponding to node C3 has acquired business entity B2, corresponding to node C2 in the second quarter. In Q3 graph 602c, nodes C2 and C4 are not present. In the similar way, link L3 in Q3 graph 602c represents that business entity B1, corresponding to node C1 has acquired business entity B3, corresponding to node C3 in the third quarter. Since by the fourth quarter, only business entity B1 is left, as all other business entities were acquired, therefore Q3 graph 602c only includes node C1 representing financial data and news data associated with business entity B1.

The dynamic bipartite knowledge graph 602 keeps on changing with time due to its dynamic nature. In other words, the attributes or financial data and news data keep on changing even for every quarter. Further, after every quarter the count of business entities will change if some business entity gets acquired in the previous quarter or if any business entity shuts down due to some reason. This makes it impossible to apply graph algorithms on the dynamic bipartite knowledge graph 602 due to its dynamic nature. Therefore, to address this problem, the dynamic bipartite knowledge graph 602 is converted into the static bipartite knowledge graph 604 using graph conversion algorithms.

In contrast to the dynamic bipartite knowledge graph 602, the static bipartite knowledge graph 604 does not include sub-graphs representing each quarter. Instead, each node in the static bipartite knowledge graph 604 represents a business entity for a quarter. Therefore, unless a business entity is acquired by another business entity, each business entity will be represented by four nodes corresponding to every quarter of a year. For example, the static bipartite knowledge graph 604 includes four nodes C1Q1, C1Q2, C1Q3, and C1Q4 corresponding to business entity B1 for first, second, third, and fourth quarters of the year, respectively. The edges or links of the static bipartite knowledge graph 604 represent which business entity has acquired another business entity in a particular quarter. The strength of the link represents the probable growth rates associated with business entity determined by the candidate generation engine 218. In the first quarter, business entity B1 acquired business entity B4. The acquisition is shown by a link L4 which is directed from node C1Q1 to node C4Q4. Similarly, links L5 and L6 represent the acquisition of business entities B2 and B3 in second and third quarters, respectively.

Each node in the static bipartite knowledge graph 604 is characterized by the financial data and news data for a particular quarter. Therefore, the information represented by each node is constant and does not change with time in the static bipartite knowledge graph 604.

Figure 7:
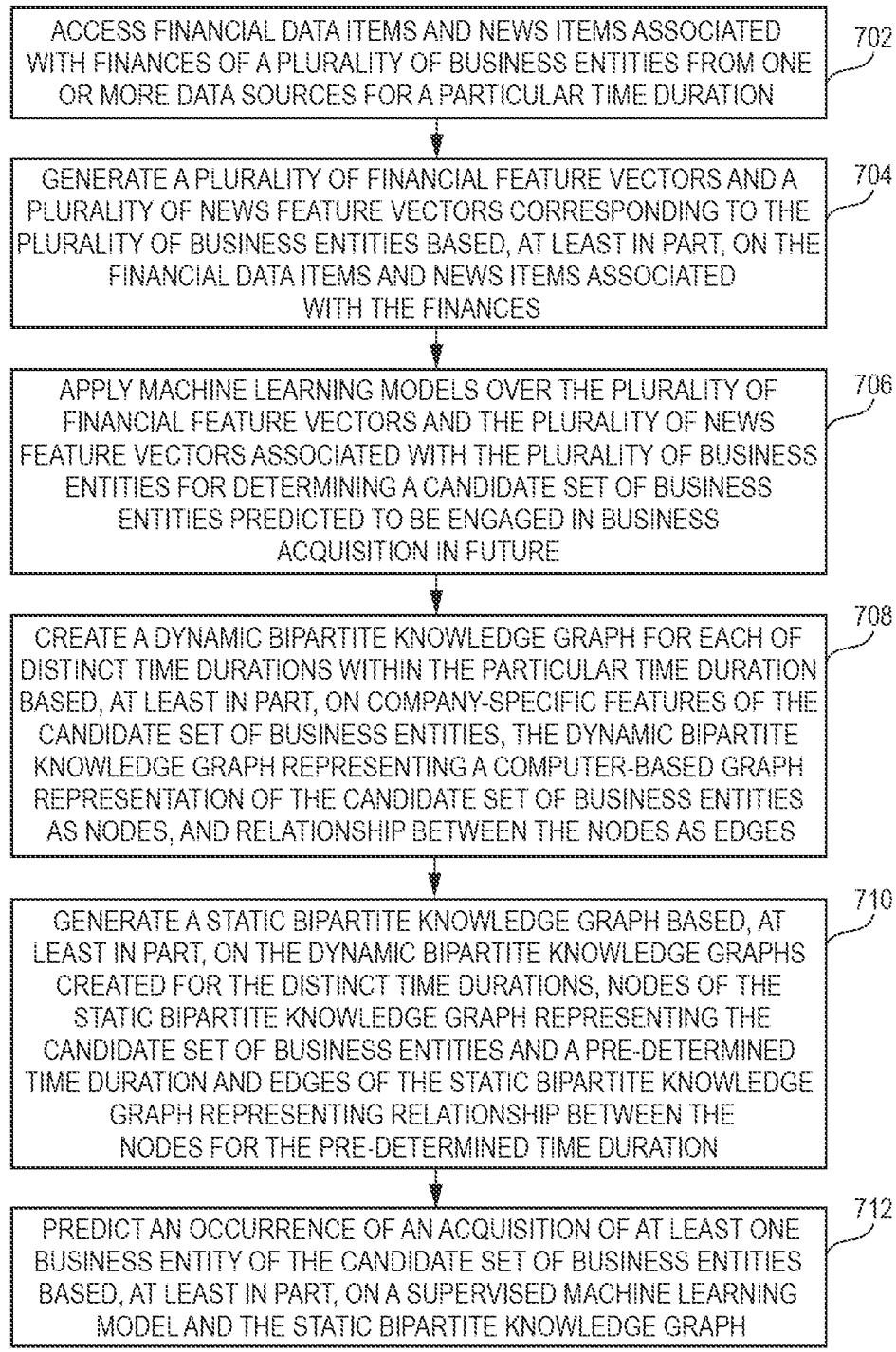
FIG. 7 represents a flow diagram of a method for predicting future acquisitions, in accordance with one embodiment of the present disclosure.

FIG. 7 represents a flow diagram of a computer-implemented method 700 for predicting an acquisition of a business entity by another, in accordance with an example embodiment. The method 700 depicted in the flow diagram may be executed by the server system 104 or the server system 200. Operations of the method 700, and combinations of operation in the method 700, may be implemented by, for example, hardware, firmware, a processor, circuitry and/or a different device associated with the execution of software that includes one or more computer program instructions. The method 700 starts at operation 702.

As shown in the FIG. 7, at the operation 702, the method 700 includes accessing financial data items and news items associated with finances of a plurality of business entities from one or more data sources for a particular time duration.

At operation 704, the method 700 includes generating a plurality of financial feature vectors and a plurality of news feature vectors corresponding to the plurality of business entities based, at least in part, on the financial data items and news items associated with finances.

At operation 706, the method 700 includes applying machine learning models over the plurality of financial feature vectors and the plurality of news feature vectors associated with the plurality of business entities for determining a candidate set of business entities predicted to be engaged in business acquisition in future.

At operation 708, the method 700 includes creating a dynamic bipartite knowledge graph for each of distinct time durations (e.g., quarter of a year) within the particular time duration (e.g., 2 years) based, at least in part, on company-specific features of the candidate set of business entities. The dynamic bipartite knowledge graph represents a computer-based graph representation of the candidate set of business entities as nodes, and relationship between the nodes as edges.

At operation 710, the method 700 includes generating a static bipartite knowledge graph based, at least in part, on dynamic bipartite knowledge graphs created for the distinct time durations. Nodes of the static bipartite knowledge graph represent the candidate set of business entities and a pre-determined time duration (e.g., a particular quarter) and edges of the static bipartite knowledge graph representing relationship between the nodes for the pre-determined time duration. The company-specific features include the financial data items, the news items, and probable growth rates associated with each business entity after acquisition.

At operation 712, the method 700 includes predicting an occurrence of an acquisition of at least one business entity of the candidate set of business entities based, at least in part, on a supervised machine learning model and the static bipartite knowledge graph.

The disclosed method with reference to FIG. 7, or one or more operations of the server system 200 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) executed on a computer (e.g., any suitable computer, such as a laptop computer, net book, Web book, tablet computing device, smart phone, or other mobile computing device)). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 200 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, performed by a server system, comprising:
   accessing financial data and news data associated with finances of a plurality of business entities from one or more data sources for a particular time duration;
   extracting a plurality of financial feature vectors and a plurality of news feature vectors corresponding to the plurality of business entities from the financial data and the news data associated with the finances;
   applying a first long short-term memory (LSTM) model over the plurality of financial feature vectors to output a first set of vectors, the first LSTM model having been trained based, at least in part, on past financial data items associated with the plurality of business entities and applying a second long short-term memory (LSTM) model over the plurality of news feature vectors associated with the plurality of business entities to output a second set of vectors, the second LSTM model having been trained based, at least in part, on past news items associated with the plurality of business entities, wherein the first LSTM model and the second LSTM model comprise a form of recurrent neural networks having a series of LSTM cells;
   concatenating the first set of vectors and the second set of vectors to obtain a set of concatenated vectors;
   for each business entity of the plurality of business entities, generating probable growth rates on acquiring another business entity and on getting acquired by another business entity by applying a feed-forward neural network model over the set of concatenated vectors;

selecting a candidate set of business entities predicted to be engaged in business acquisition in future based, at least in part, on the generated probable growth rates;

creating a dynamic bipartite knowledge graph for each of distinct time durations within the particular time duration based, at least in part, on company-specific features of the candidate set of business entities, the dynamic bipartite knowledge graph representing a computer-based graph representation of the candidate set of business entities as nodes, and relationship between the nodes as edges;

generating a static bipartite knowledge graph based, at least in part, on dynamic bipartite knowledge graphs created for the distinct time durations, nodes of the static bipartite knowledge graph representing the candidate set of business entities and a pre-determined time duration and edges of the static bipartite knowledge graph representing relationship between the nodes for the pre-determined time duration;

encoding the static bipartite knowledge graph into graph embedding vectors based on a bipartite graph embedding model; and predicting an occurrence of an acquisition of at least one business entity of the candidate set of business entities by applying a supervised machine learning model over the graph embedding vectors.

2. The computer-implemented method as claimed in claim 1, wherein extracting a plurality of news feature vectors corresponding to the plurality of business entities comprises feeding the news data to a one-hot vector encoder to convert the news data into one-hot vector of a vocabulary of words and feeding the one-hot vector to a word to vector encoder that creates the plurality of news feature vectors.

3. The computer-implemented method as claimed in claim 1, wherein the company-specific features comprise the financial data items, the news items, and the generated probable growth rates associated with the each business entity.

4. The computer-implemented method as claimed in claim 1, wherein bipartite graph embedding model comprises:
a deepwalk, a matrix factorization, a large-scale information network embedding (LINE) a Bayesian personalized ranking, or a graph2vector.

5. The computer-implemented method as claimed in claim 1, wherein encoding the static bipartite knowledge graph into the graph embedding vectors further comprises:
converting the static bipartite knowledge graph into positive and negative triplets, wherein the positive triplets are $N_{p1}$ representing a first business entity, $N_{p2}$ representing a second business entity, and $E_{p1}$ representing an already existing link between the first and second business entities, and wherein the negative triplets are $N_{n1}$ representing a first business entity, $N_{n2}$ representing a second business entity, and $E_{n1}$ representing no link present between the first and second business entities.

6. The computer-implemented method as claimed in claim 1, wherein each financial feature vector is a function of one or more of:
total assets, asset growth rate, total loans, total losses, loan growth rate, gross loans, gross assets, and total deposits.

7. A server system, comprising:
a communication interface;
a memory comprising executable instructions; and
a processor communicably coupled to the communication interface, the processor configured to execute the executable instructions to cause the server system to at least:
access financial data and news data associated with finances of a plurality of business entities from one or more data sources for a particular time duration;
extract a plurality of financial feature vectors and a plurality of news feature vectors corresponding to the plurality of business entities from b the financial data and the news data associated with the finances;
apply a first long short-term memory (LSTM) model over the plurality of financial feature vectors to output a first set of vectors, the first LSTM model having been trained based, at least in part, on past financial data items associated with the plurality of business entities and apply a second long short-term memory (LSTM) model over the plurality of news feature vectors associated with the plurality of business entities to output a second set of vectors, the second LSTM model having been trained based, at least in part, on past news items associated with the plurality of business entities, wherein the first LSTM model and the second LSTM model comprise a form of recurrent neural networks having a series of LSTM cells;
concatenate the first set of vectors and the second set of vectors to obtain a set of concatenated vectors;
for each business entity of the plurality of business entities, generate probable growth rates on acquiring another business entity and on getting acquired by another business entity by applying a feed-forward neural network model over the set of concatenated vectors;
select a candidate set of business entities predicted to be engaged in business acquisition in future based, at least in part, on the generated probable growth rate;
create a dynamic bipartite knowledge graph for each of distinct time durations within the particular time duration based, at least in part, on company-specific features of the candidate set of business entities, the dynamic bipartite knowledge graph representing a computer-based graph representation of the candidate set of business entities as nodes, and relationship between the nodes as edges;
generate a static bipartite knowledge graph based, at least in part, on dynamic bipartite knowledge graphs created for the distinct time durations, nodes of the static bipartite knowledge graph representing the candidate set of business entities and a pre-determined time duration and edges of the static bipartite knowledge graph representing relationship between the nodes for the pre-determined time duration;
encode the static bipartite knowledge graph into graph embedding vectors based on a bipartite graph embedding model; and
predict an occurrence of an acquisition of at least one business entity of the candidate set of business entities by applying a supervised machine learning model over the graph embedding vectors.

8. The server system as claimed in claim 7, wherein strength of each edge in the dynamic bipartite knowledge graph is determined based, at least in part, on the generated probable growth rates.

9. The server system as claimed in claim 7, wherein the company-specific features comprise the financial data items, the news items, and the generated probable growth rates associated with each business entity.

10. The server system as claimed in claim 7, wherein the bipartite graph embedding model comprises:
   a deepwalk, a matrix factorization, a large-scale information network embedding (LINE), a Bayesian personalized ranking, or a graph2vector.

11. The server system as claimed in claim 7, wherein in order to encode the static bipartite knowledge graph into the graph embedding vectors, the server system is further caused to at least in part to:
   convert the static bipartite knowledge graph into positive and negative triplets, wherein the positive triplets are $N_{p1}$ representing a first business entity, $N_{p2}$ representing a second business entity, and $E_{p1}$ representing an already existing link between the first and second business entities, and wherein the negative triplets are $N_{n1}$ representing a first business entity, $N_{n2}$ representing a second business entity, and $E_{n1}$ representing no link present between the first and second business entities.

12. The server system as claimed in claim 7, wherein each financial feature vector is a function of one or more of: total assets, asset growth rate, total loans, total losses, loan growth rate, gross loans, gross assets, and total deposits.

13. A computer-implemented method, performed by a server system, comprising:
   accessing financial data and news data associated with finances of a plurality of business entities from one or more data sources for a particular time duration;
   extracting a plurality of financial feature vectors and a plurality of news feature vectors corresponding to the plurality of business entities from the financial data and the news data associated with the finances;
   applying a first long short-term memory (LSTM) model over the plurality of financial feature vectors to output a first set of vectors, the first LSTM model having been trained based, at least in part, on past financial data items associated with the plurality of business entities and applying a second long short-term memory (LSTM) model over the plurality of news feature vectors associated with the plurality of business entities to output a second set of vectors, the second LSTM model having been trained based, at least in part, on past news items associated with the plurality of business entities, wherein the first LSTM model and the second LSTM model comprise a form of recurrent neural networks having a series of LSTM cells;
   concatenating the first set of vectors and the second set of vectors to obtain a set of concatenated vectors;
   for each business entity of the plurality of business entities, generating probable growth rates on acquiring other business entity and on getting acquired by other business entity by applying a feed-forward neural network model over the set of concatenated vectors;
   selecting a candidate set of business entities predicted to be engaged in business acquisition in future based, at least in part, on the generated probable growth rate;
   creating a dynamic bipartite knowledge graph for each of distinct time durations within the particular time duration based, at least in part, on company-specific features of the candidate set of business entities, the dynamic bipartite knowledge graph representing a computer-based graph representation of the candidate set of business entities as nodes, and relationship between the nodes as edges;
   generating a static bipartite knowledge graph based, at least in part, on dynamic bipartite knowledge graphs created for the distinct time durations, nodes of the static bipartite knowledge graph representing the candidate set of business entities and a pre-determined time duration and edges of the static bipartite knowledge graph representing relationship between the nodes for the pre-determined time duration;
   encoding the static bipartite knowledge graph into graph embedding vectors based, at least in part, on a bipartite graph embedding model; and
   predicting an occurrence of an acquisition of at least one business entity of the candidate set of business entities by applying a supervised machine learning model over the graph embedding vectors.

14. The computer-implemented method as claimed in claim 13, wherein strength of each edge in the dynamic bipartite knowledge graph is determined based, at least in part, on the generated probable growth rates.

15. The computer-implemented method as claimed in claim 13, wherein the company-specific features comprise the financial data items, the news items, and the generated probable growth rates associated with each business entity.

16. The computer-implemented method as claimed in claim 13, wherein each financial feature vector is a function of one or more of: total assets, asset growth rate, total loans, total losses, loan growth rate, gross loans, gross assets, or total deposits.

17. The computer-implemented method as claimed in claim 13, wherein in order to encode the static bipartite knowledge graph into the graph embedding vectors, the computer-implemented method further:
   converts the static bipartite knowledge graph into positive and negative triplets, wherein the positive triplets are $N_{p1}$ representing a first business entity, $N_{p2}$ representing a second business entity, and $E_{p1}$ representing an already existing link between the first and second business entities, and wherein the negative triplets are $N_{n1}$ representing a first business entity, $N_{n2}$ representing a second business entity, and $E_{n1}$ representing no link present between the first and second business entities.

18. The computer-implemented method as claimed in claim 13, wherein strength of each edge in the dynamic bipartite knowledge graph is determined based, at least in part, on the generated probable growth rates.

* * * * *